United States Patent
Tao et al.

(10) Patent No.: US 10,774,930 B1
(45) Date of Patent: Sep. 15, 2020

(54) RATIO SELECTION METHOD FOR A CONTINUOUSLY VARIABLE TRANSMISSION DURING DECELERATION BY BRAKING

(71) Applicant: GM Global Technology Operations LLC, Detroit, MI (US)

(72) Inventors: Xuefeng T. Tao, Northville, MI (US); Steven P. Moorman, Dexter, MI (US); Ronald W. Van Diepen, Ann Arbor, MI (US); Jeffrey M. DeSimone, Royal Oak, MI (US); Madhura N. Paranjape, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/418,593

(22) Filed: May 21, 2019

(51) Int. Cl.
*F16H 61/66* (2006.01)
*F16H 61/662* (2006.01)
*F16H 59/48* (2006.01)
*F16H 59/54* (2006.01)
*F16H 59/36* (2006.01)
*F16H 59/68* (2006.01)
*F16H 59/72* (2006.01)
*F16H 59/70* (2006.01)

(52) U.S. Cl.
CPC .......... *F16H 61/66* (2013.01); *F16H 61/662* (2013.01); *F16H 59/36* (2013.01); *F16H 59/48* (2013.01); *F16H 59/54* (2013.01); *F16H 59/70* (2013.01); *F16H 59/72* (2013.01); *F16H 2059/366* (2013.01); *F16H 2059/683* (2013.01); *F16H 2059/704* (2013.01); *F16H 2061/6604* (2013.01)

(58) Field of Classification Search
None
See application file for complete search history.

(56) References Cited

U.S. PATENT DOCUMENTS

| | | | | |
|---|---|---|---|---|
| 5,036,730 | A * | 8/1991 | Sakai | F16H 61/0213 477/121 |
| 5,913,916 | A * | 6/1999 | Bai | F16H 61/0213 477/131 |
| 7,097,587 | B2 | 8/2006 | Kanafani et al. | |
| 2014/0324306 | A1* | 10/2014 | Heap | B60W 20/10 701/58 |
| 2017/0066437 | A1* | 3/2017 | Yamamoto | B60K 6/48 |
| 2019/0170231 | A1* | 6/2019 | Duan | F16H 37/022 |

* cited by examiner

Primary Examiner — Justin Holmes

(57) ABSTRACT

A method and system for selecting a speed ratio for a continuously variable transmission (CVT) of a vehicle during braking. The method and system includes determining a Current Actual Speed Ratio of the CVT when the distance of a brake pedal travel exceeds a predetermined distance, determining, by a transmission control module (TCM), an amount of Available Speed Ratio Change ($\Delta r$), a Current Ratio Change Capability (Current-$\dot{r}$), and a Predictive Ratio Change Capability (Predictive-$\dot{r}$). The method further includes the TCM calculating a Time to Reach the Minimum Under-drive Ratio ($t_{UD}$), calculating a Predicted Velocity of the Vehicle ($v_{Pr}$) using ($t_{UD}$), determining a Desired Speed Ratio of the CVT using the Predicted Velocity of the Vehicle ($v_{Pr}$), and actuating the CVT to the Desired Speed Ratio.

20 Claims, 3 Drawing Sheets

RATIO SELECTION METHOD FOR A CONTINUOUSLY VARIABLE TRANSMISSION DURING DECELERATION BY BRAKING

INTRODUCTION

The present disclosure relates to a method for operating a continuously variable transmission (CVT) of a motor vehicle, more particularly to a method for ratio selection of the CVT during deceleration by braking of the motor vehicle.

CVT are known in the art and generally include primary and secondary pulleys used to continuously vary the transmission ratio of engine speed to vehicle speed in a motor vehicle. One method for controlling the continuously variable transmission ratio (in lieu of manual selecting) is to use map ratios or lookup tables having predefined CVT speed ratios. The CVT speed ratio is defined as a secondary pulley speed divided by a primary pulley speed, or a chain radius of the primary pulley divided by a chain radius of the secondary pulley.

A transmission control module (TCM) uses a current engine speed, along with the known vehicle speed and accelerator pedal position, and a look-up table to calculate a speed ratio for the CVT during acceleration and steady state cruising of the vehicle. However, during deceleration under braking, in which a driver or a vehicle safety system actively applies the brake, the TCM determines the speed ratio of the CVT based on the change of brake pedal position and a look-up table based on the brake pedal position. However, in situations where the driver brings the vehicle to an abrupt stop, such as in an emergency stop situation, the known method of selecting speed ratios may not be sufficient for the TCM to determine and shift the CVT to its minimum under-drive speed ratio, which is typically 0.38, before the vehicle comes to a complete stop. This may result in the CVT being at a higher speed ratio than desired for efficiently and smoothly launching the vehicle from a complete stop.

Thus, while current method for ratio selection of the CVT during deceleration by braking of the motor vehicle achieves its purpose, there is a continual need to more accurately select speed ratios during periods of abrupt stops to ensure efficient and smooth operation of the vehicle.

SUMMARY

According to several aspects, a method for selecting a speed ratio for a continuously variable transmission (CVT) of a vehicle during braking is disclosed. The method includes determining a distance of a brake pedal travel; determining a Current Actual Speed Ratio of the CVT when the distance of the brake pedal travel exceeds a predetermined distance; determining an amount of Available Speed Ratio Change ($\Delta r$); determining a Current Ratio Change Capability (Current-$\dot{r}$) of the CVT, determining a Predictive Ratio Change Capability (Predictive-$\dot{r}$) using the Current Ratio Change Capability (Current-$\dot{r}$), calculating a Time to Reach the Minimum Under-drive Ratio ($t_{UD}$), wherein ($t_{UD}$) includes the Available Speed Ratio Change ($\Delta r$) divided by the Predictive Ratio Change Capability (Predictive-$\dot{r}$); calculating a Predicted Velocity of the Vehicle ($v_{Pr}$) using ($t_{UD}$), determining a Desired Speed Ratio of the CVT using the Predicted Velocity of the Vehicle ($v_{Pr}$), and actuating the CVT to the Desired Speed Ratio.

In an additional aspect of the present disclosure, $\Delta r$=(minimum under-drive speed ratio)–(Current Actual Speed Ratio).

In another aspect of the present disclosure, the minimum under-drive speed ratio is about 0.38.

In another aspect of the present disclosure, the Current Ratio Change Capability (Current-$\dot{r}$) is a measure of how quickly that the CVT can change speed ratios based on the current operating conditions of the CVT, including engine revolutions per min (engine rpm), transmission fluid temperature, and transmission fluid pressure.

In another aspect of the present disclosure, the (Predictive-$\dot{r}$)=(Current-$\dot{r}$)/2.

In another aspect of the present disclosure, the (Predictive-$\dot{r}$)=[(Current-$\dot{r}$)+K]/2, where K is a Ratio Change Capability at an idle engine rpm.

In another aspect of the present disclosure, the Time to Reach Minimum Underdrive ($t_{UD}$)={($\Delta r \times K1$)/[(Predictive-$\dot{r}$)$\times K2$]}+K3, where: K1=Calibration Constant, K2=Confidence Factor, and K3=a Time Margin of about 400 milliseconds.

In another aspect of the present disclosure, K1 ranges from 0.0 to 1.0 and K2 ranges from 0.0 to 1.0.

In another aspect of the present disclosure, the Predicted Velocity of the Vehicle ($v_{Pr}$) Pr, $=v_{current}$+[$d_{current} \times t_{UD} \times$ Gain], where $d_{current}$=Vehicle deceleration, and Gain=function of brake pedal position and rate of change of the brake pedal position.

In another aspect of the present disclosure, [$d_{current} \times t_{UD} \times$ Gain] is capped at –40 to –50 miles per hour.

According to several aspects, a ratio selection method for a continuously variable transmission for a vehicle during deceleration is disclosed. The method includes determining at least one of a distance of a brake pedal travel and a rate of deceleration of the vehicle, wherein rate of deceleration of the vehicle is expressed as a negative value; determining a Current Actual Speed Ratio of the CVT when the distance of the brake pedal travel exceeds a predetermined distance or when the rate of deceleration is below a predetermined value; and determining an amount of Available Speed Ratio Change ($\Delta r$), wherein $\Delta r$=(minimum under-drive speed ratio)–(Current Actual Speed Ratio); determining a Current Ratio Change Capability (Current-$\dot{r}$) of the CVT; determining a Predictive Ratio Change Capability (Predictive-$\dot{r}$), wherein (Predictive-$\dot{r}$)=[(Current-$\dot{r}$)+K]/2, where K is a Ratio Change Capability at an idle engine rpm; calculating a Time to Reach the Minimum Under-drive Ratio ($t_{UD}$), wherein ($t_{UD}$) includes the Available Speed Ratio Change ($\Delta r$) divided by the Predictive Ratio Change Capability (Predictive-$\dot{r}$); calculating a Predicted Velocity of the Vehicle ($v_{Pr}$) using ($t_{UD}$), determining a Desired Speed Ratio of the CVT using the Predicted Velocity of the Vehicle ($v_{Pr}$), and actuating the CVT to the Desired Speed Ratio.

In an additional aspect of the present disclosure, the Time to Reach Minimum Underdrive ($t_{UD}$)={($\Delta r \times K1$)/[(Predictive-$\dot{r}$)$\times K2$]}+K3, where: K1=Calibration Constant, K2=Confidence Factor, and K3=a Time Margin of about 400 milliseconds.

In another aspect of the present disclosure, the predicted Velocity of the Vehicle ($v_{Pr}$)=$v_{current}$ [$d_{current} \times t_{UD} \times$ Gain], where: $d_{current}$=Vehicle deceleration; and Gain=function of brake pedal position and rate of change of the brake pedal position.

In another aspect of the present disclosure, wherein [$d_{current} \times t_{UD} \times$ Gain] is capped at –40 to –50 miles per hour.

In another aspect of the present disclosure, wherein K1 ranges from 0.0 to 1.0 and K2 ranges from 0.0 to 1.0.

According to several aspects, a system for implement a method for selecting a speed ratio for a continuously variable transmission (CVT) of a vehicle during braking. The system includes a vehicle speed sensor configured to detect the velocity of the vehicle; a CVT speed ratio sensor; a brake pedal position sensor; at least one powertrain operating factor sensor; and a transmission control module (TCM) in communication with the vehicle speed sensor, CVT speed ratio sensor, and the at least one powertrain operating factor sensor. The TCM is configured to determine a distance of a brake pedal travel; determine a Current Actual Speed Ratio of the CVT when the distance of the brake pedal travel exceeds a predetermined distance; determine an amount of Available Speed Ratio Change ($\Delta r$), wherein $\Delta r$=(minimum under-drive speed ratio)−(Current Actual Speed Ratio); and determine a Desired Speed Ratio of the CVT.

In an additional aspect of the present disclosure, the TCM is further configured to determine a Current Ratio Change Capability (Current-$\dot{r}$) of the CVT; and determine a Predictive Ratio Change Capability (Predictive-$\dot{r}$) using the Current Ratio Change Capability (Current-$\dot{r}$).

In another aspect of the present disclosure, the TCM is further configured to calculate a Time to Reach the Minimum Under-drive Ratio ($t_{UD}$), wherein ($t_{UD}$) includes the Available Speed Ratio Change ($\Delta r$) divided by the Predictive Ratio Change Capability (Predictive-$\dot{r}$), and calculate a Predicted Velocity of the Vehicle ($v_{Pr}$) using ($t_{UD}$).

In another aspect of the present disclosure, the TCM is further configured to determine a Desired Speed Ratio of the CVT using the Predicted Velocity of the Vehicle ($v_{Pr}$); and actuate the CVT to the Desired Speed Ratio.

In another aspect of the present disclosure, wherein (Predictive-$\dot{r}$)=[(Current-$\dot{r}$)+K]/2, where K is a Ratio Change Capability at an idle engine rpm; Time to Reach Minimum Underdrive ($t_{UD}$)={($\Delta r$×K1)/[(Predictive-$\dot{r}$)×K2]}+K3, where: K1=Calibration Constant, K2=Confidence Factor, and K3=a Time Margin of about 400 milliseconds; and the Predicted Velocity of the Vehicle ($v_{Pr}$)=$v_{current}$+[$d_{current}$×$t_{UD}$×Gain], where $d_{current}$=Vehicle deceleration; and Gain=function of brake pedal position and rate of change of the brake pedal position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
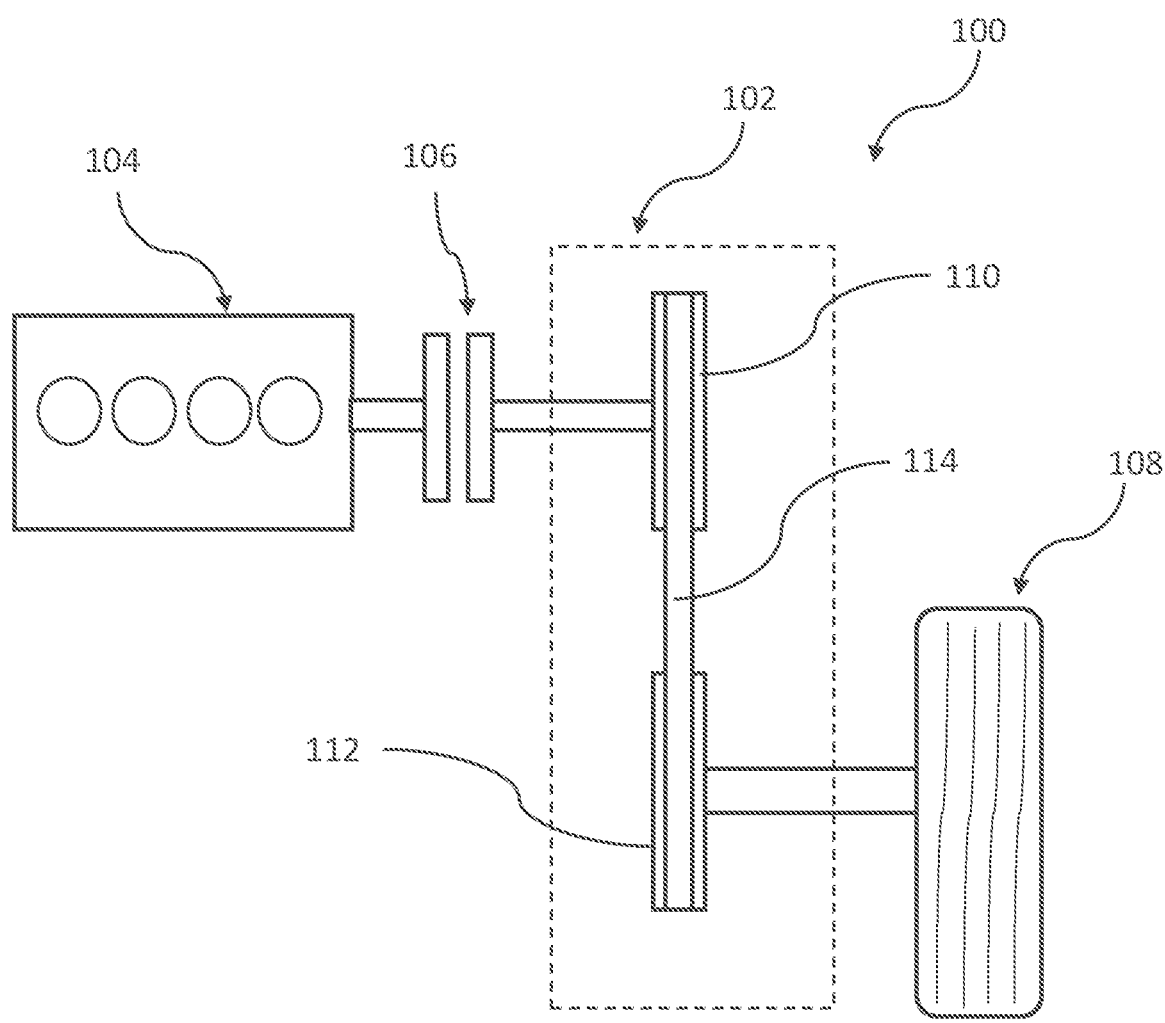
FIG. 1 is a schematic illustration of a powertrain system of a vehicle having a continuously variable transmission (CVT), according to an exemplary embodiment.

FIG. 1 shows an exemplary powertrain 100 having a continuously variable transmission (CVT) 102. The powertrain 100 shown includes an internal combustion engine 104 coupled to a selective torque transmitting device such as a torque converter 106. The torque converter 106 is in turn coupled to the CVT 102. The CVT 102 is in turn connected through a differential (not shown) to a wheel 108 of a motor vehicle.

The CVT 102 generally includes a primary pulley 110 coupled to a secondary pulley 112 via a belt 114 or a chain 114. The primary pulley 110 is driven by the engine 104 through the torque converter 106. When the torque converter 106 is fully locked, the engine speed is approximately equal to the speed of the primary pulley 110. The primary pulley 110, also referred to as an input pulley 110, drives the belt 114 which in turn drives the secondary pulley 112, also referred to as an output pulley 112. The secondary pulley 112 may be coupled to the wheels 108 through a differential (not shown). The vehicle speed is in turn approximately a direct function of the secondary pulley 112 speed, based upon the gear ratio through the differential or any final drive gear (not shown). When the vehicle is at a stop, it is preferable that the speed ratio of the CVT is at the minimal underdrive ratio, which is preferably at 0.38. The speed ratio is defined as:

$$\text{Speed Ratio} = Ws/Wp \text{ or } Rp/Rs,$$

where:
Ws is the secondary pulley speed;
Wp is the primary pulley speed;
Rp is the chain radius of the primary pulley; and
Rs is the chain radius of the secondary.

Figure 2:
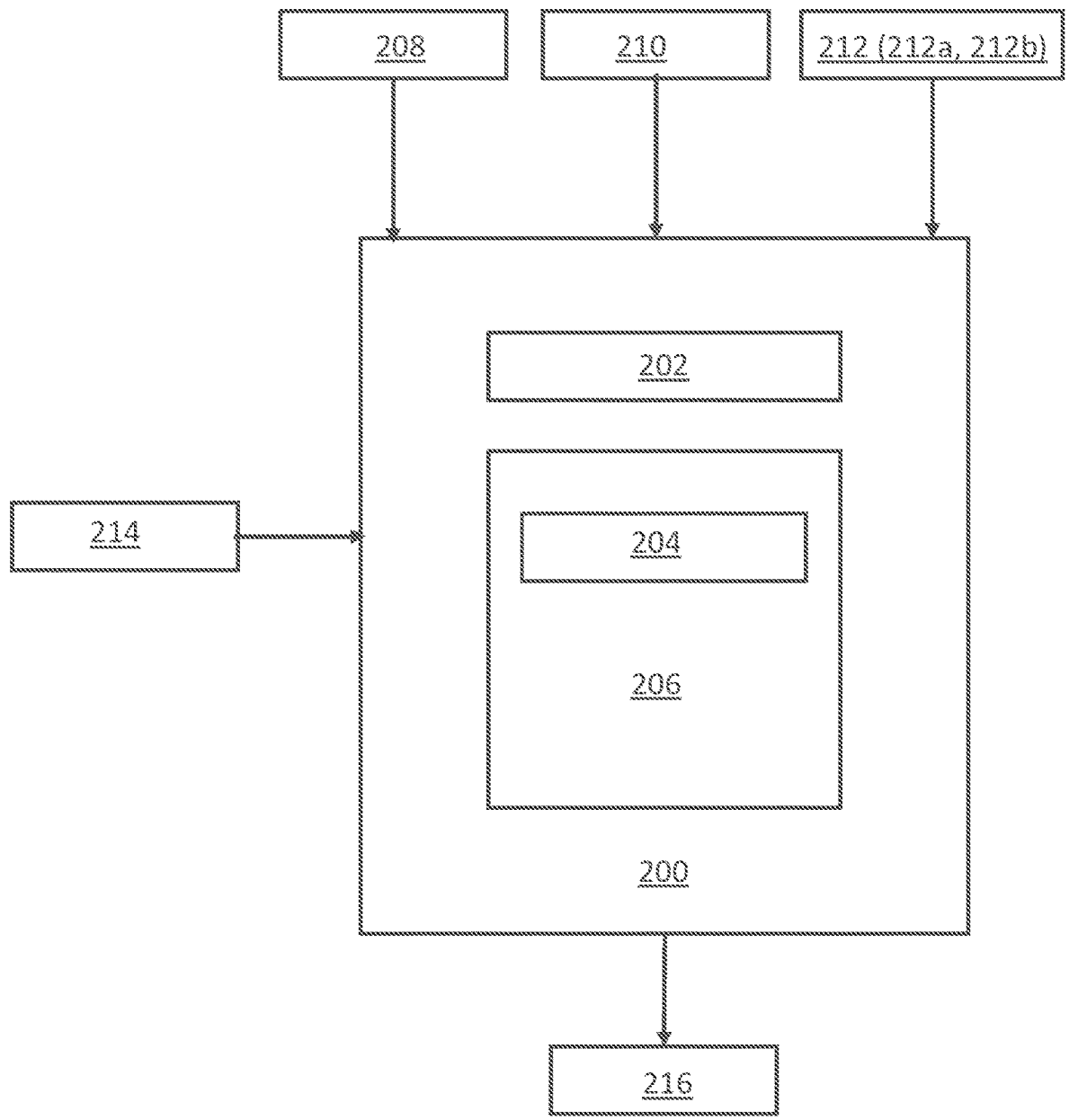
FIG. 2 is a functional diagram of a transmission control module (TCM) for selecting a speed ratio for the CVT under deceleration by braking, according to an exemplary embodiment.

Referring to FIG. 2, the transmission control module (TCM) 200 includes a processor 202 and a memory 204. The TCM 200 receives information from the vehicle state sensors, such as a brake pedal position sensor 208, a vehicle speed sensor 210, a CVT speed ratio sensor 212, and various powertrain operating factor sensors 214. The brake pedal position sensor 208 is configured to detect a position of the brake pedal from the non-depressed position, non-actuated brake pedal, to a fully-depressed position, fully actuated brake pedal.

The speed sensor 210 is configured to detect the velocity of the vehicle and may be that of a transmission output speed sensor (TOSS). The CVT speed ratio sensor 212 is configured to detect the current, or instant, speed ratio of the CVT 102. The CVT speed ratio sensor 212 may include a primary pulley speed sensor 212a configured to detect the primary pulley speed (Wp) and a secondary pulley speed sensor 212b configured to detect the secondary pulley speed (Ws). The secondary pulley speed sensor 212b may be that of the speed sensor 210 used to calculate the vehicle speed.

The various powertrain operating factor sensors 214 are configured to detect the engine revolutions per min (engine rpm), the transmission fluid temperature, and the transmission fluid pressure that is used to operate the hydraulic actuators 216 for changing the speed ratios of the CVT 102. While hydraulic actuators 216 are described, it should be appreciated that electro-mechanical actuators may also be used in conjunction with or used in place of the hydraulic actuators 216 for changing the speed ratios of the CVT 102.

The TCM 200 is in communication with hydraulic actuators 216 that controls the speed ratio of the CVT. The processor 202 processes information gathered by the vehicle state sensors 208, 210, 212, 214 and execute the method 300 that is stored as a software routine 204 in the memory 206 to issue instructions to the hydraulic actuators 216. The processor 202 may be any conventional processor including CPUs and micro-processors. The memory 206 may be any computing device readable medium such as hard-drives, solid state memory, ROM, RAM, DVD or any other medium that is capable of storing information that is accessible to the processor 202. Although only one processor 202 and memory 206 is shown, it is understood that the TCM 200 may contain multiple processors 202 and memories 206, as well as various software routines 204 for implementing the method 300. Accordingly, references to processor 202 and memory 206 include references to a collection of such processors and memories that may or may not operate in parallel.

Figure 3:
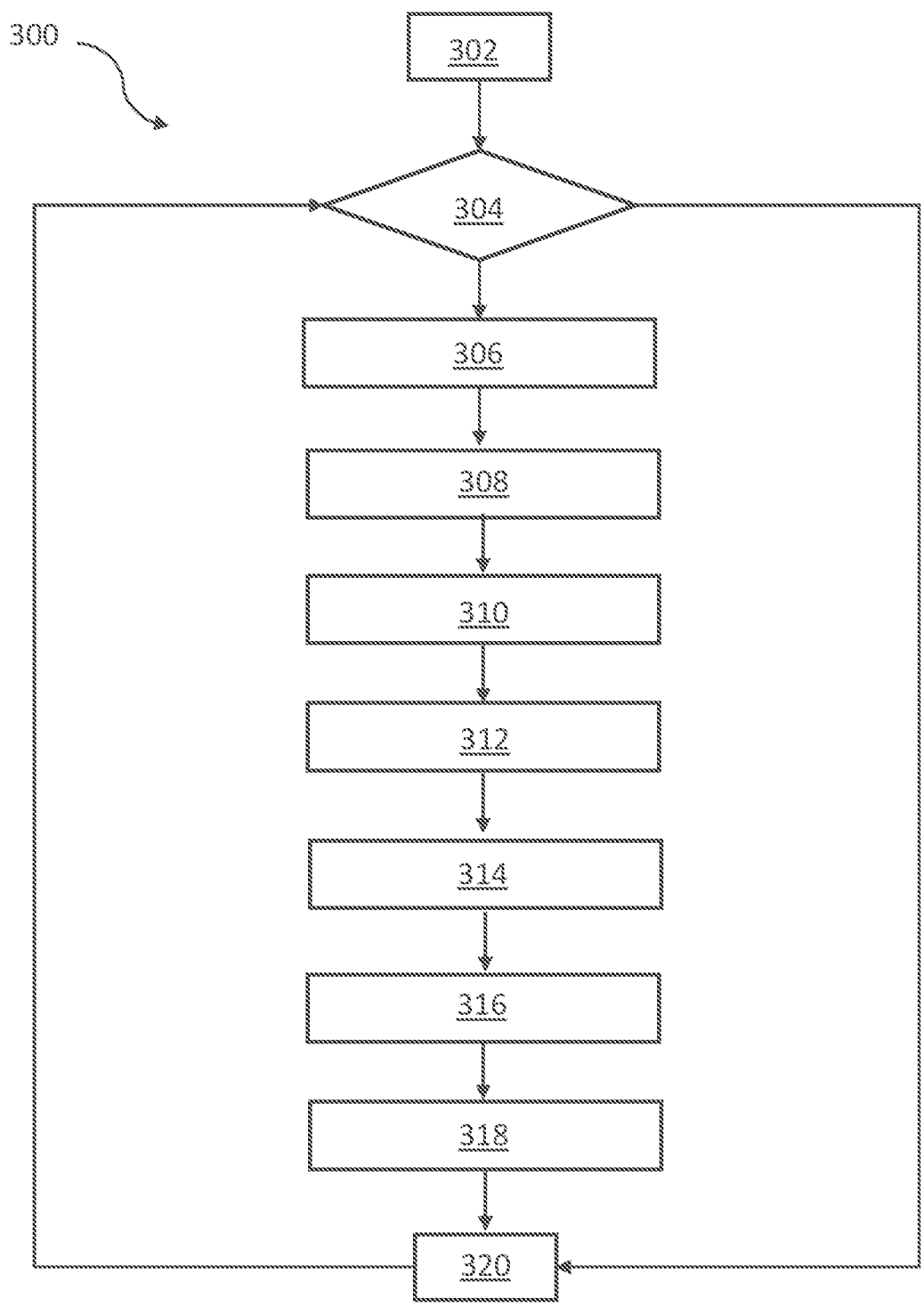
FIG. 3 is a block diagram of a method for selecting the speed ratio for the CVT under deceleration by braking.

Turning now to FIG. 3, the transmission ratio selection method 300 will be discussed in detail. The ratio selection method 300 uses the input from the brake position sensor 208 and vehicle velocity sensor 210 to predict speed ratios when the vehicle is decelerating under braking. The TCM continuously adjusts the speed ratios of the CVT 102 by using the predicted speed ratios such that the speed ratio of the CVT 102 arrives at its minimal under-drive speed ratio, which is typically 0.38, if and when the vehicle comes to a complete stop.

During deceleration by braking, the driver of the motor vehicle depresses the brake pedal to activate the braking system of the vehicle thereby reducing the velocity of the vehicle. The amount of braking demanded corresponds with the amount of brake pedal travel, which is typically determined by a voltage sensor that determines the position of the brake pedal. The requested braking demand based on the brake position sensor 208 along with the current vehicle speed from the vehicle velocity sensor 210 is communicated to the TCM 200.

The TCM 200 implements the method 300 by processing the braking demand and vehicle speed to predict speed ratio changes for the CVT during deceleration and sends a signal to the actuator 216 to adjust the CVT speed ratios accordingly. The method 300 determines the brake pedal position rate of change, vehicle deceleration, and current speed ratio to predict speed ratio changes for the CVT as the vehicle is decelerating. The method 300 provides active prediction of decelerating speed ratio changes as opposed to known methods that provides speed ratio changes by reacting to the current brake pedal position. The predictive nature of the method is continually monitoring inputs and adjusting the target ratio over the course of the deceleration.

The method 300 starts in step 302, when the vehicle is in motion. In step 304, the TCM 200 monitors the position of the brake pedal and determines if the position of the brake pedal has been depressed beyond a predetermined distance, either by the driver of the vehicle or by a driver assisted system, based off of information received from the brake pedal position sensor 208. If the predetermined distance of the brake pedal travel is exceeded, then the method proceeds to step 306. In step 304, the TCM 200 also determines the rate of deceleration of the vehicle based on information received from the vehicle velocity sensor 210. If the rate of deceleration is below a predetermined rate of deceleration, which is expressed as a negative value during vehicle braking and deceleration, then the method 300 proceeds to step 306. If neither the position of the brake pedal has been depressed beyond a predetermined distance nor the rate of deceleration is below a predetermined rate of deceleration, then the method 300 proceeds to step 320.

From step 320, the method 300 may end or return to step 304 to continuously repeat itself until it detects the position of the brake pedal has been depressed beyond the predetermined distance or the rate of deceleration is below a predetermined rate of deceleration.

From step 304, if the TCM 200 determines that the brake pedal has been depressed beyond the predetermined distance, or the rate of deceleration is below a predetermined rate of deceleration, then the method proceeds to step 306. In step 306, the TCM 200 calculate an amount of Available Speed Ratio Change. The amount of Available Speed Ratio Change ($\Delta r$) is defined as the difference between the minimum under-drive speed ratio, which is typically 0.38, and the current actual speed ratio.

$$\Delta r = (\text{minimum under-drive speed ratio}) - (\text{Current Actual Speed Ratio})$$

From step 306, the method proceeds to step 308. In step 308, the Current Ratio Change Capability (Current-$\dot{r}$) of the CVT is determined by the TCM. A Ratio Change Capability ($\dot{r}$) is the measure of how quickly that the CVT can change speed ratios based on the current operating conditions of the CVT, also referred to as the instant operating factors. Such instant operating factors includes engine revolutions per min (engine rpm), transmission fluid temperature, and transmission fluid pressure. Also in step 308, the TCM determines whether there is a fault with the vehicle sensors 208, 210, 212, and 214. Such faults may include errors in an incoming signal from a vehicle sensors 208, 210, 212, and 214. If a fault is detected, a default (Current-$\dot{r}$) is determined using predetermined ($\dot{r}$) empirical data stored in the memory 206 based off of a predetermined operating factor, such as the engine rpm. The units for ($\dot{r}$) is change in speed ratio per unit time (1/t).

A Predictive Ratio Change Capability (Predicted-$\dot{r}$) is then determined from the (Current-$\dot{r}$) based on CVT specific limitations such as the pumping capacity of the hydraulic pumps used to supply pressurized hydraulic fluids to actuate the actuator. The pumping capacity of the hydraulic pumps is determined by pump characteristic testing. The (Predictive-$\dot{r}$) is calculated as shown:

$$(\text{Predictive-}\dot{r}) = [(\text{Current-}\dot{r}) + K]/2$$

where:
(Predictive-$\dot{r}$)=Predictive Ratio Change Capability
(Current-$\dot{r}$)=Current Ratio Change Capability
K=Ratio Change Capability at idle engine rpm From step 308, the method proceeds to step 310. In step 310, the TCM calculates the time to reach the minimum under-drive ratio ($t_{UD}$) based on the Available Speed Ratio Change ($\Delta r$) divided by the Predictive Ratio Change Capability (Predictive-$\dot{r}$). Various calibration constants (K #) may be introduced to increase the robustness of the time calculation.

$$t_{UD} = \{(\Delta r \times K1)/[(\text{Predictive-}\dot{r}) \times K2]\} + K3$$

where:
$t_{UD}$=time to reach minimum underdrive
$\Delta r$=amount of available speed ratio change
(Predictive-$\dot{r}$)=Predictive Ratio Change Capability
K1=Calibration Constant
K2=Confidence Factor
K3=Time Margin (approximately 400 milliseconds (ms))

The various calibration constants (K1 through K3) may be included in the calculation of the time to reach minimum underdrive ($t_{UD}$) to improve the accuracy of the calculation based on calibration and experimental data for a particular model of CVT. The calibration constants are determined as indicated through experimental evidence and through engineering experience. As certain system performance parameters may change from one CVT implementation to another, these calibration constants may need to be altered to suit those system performance metrics. For example, K1 is determined based on repeated measured Ratio Change Capabilities for a particular model CVT. K2 is confident factor on the accuracy of the (Predictive $\dot{r}$) based on the information fed to the TCM 200 from the vehicle state sensors 208, 210, 212, 214. K3 is a time margin that is added to the original calculated time to reach minimum underdrive.

K1 is a calibration and is a fraction (range from 0.0 to 1.0) of difference between the current ratio and the minimum underdrive ratio that can be used to calculate time to reach the minimum underdrive ratio. K1 is determined based on vehicle testing under various braking maneuvers that includes different constant brake pedal positions as well as varying brake pedal positions. This is done to have proper balance between too aggressive of a change in speed ratio (always reaching 0.38 minimal underdrive ratio at a stop, but too much low speed ratio when driver applies brake hard initially and then suddenly release pedal) and not aggressive enough of a change in speed ratio (where deceleration maneuvers may not reach the minimal underdrive ratio when the vehicle comes to a complete stop).

K2 is a calibration and it is a confidence factor ranging from 0.0 (no confidence) to 1.0, (total confidence) of Predictive Ratio Change Capability (Predicted-$\dot{r}$) that can be used to calculate time to reach the minimal underdrive ratio. It is determined based on the understanding of the accuracy of pump oil flow model. K2 is a time margin added to time to reach minimal underdrive to account for hardware delays or factors not captured by the pump oil flow model.

From step 310, the method proceeds to step 312. In step 312 the speed of the vehicle is predicted when the speed ratio reaches minimum underdrive.

$$v_{Pr} = v_{current} + [d_{current} \times t_{UD} \times \text{Gain}]$$

where:
$v_{Pr}$=Predicted vehicle speed;
$v_{current}$=Current vehicle speed;
$d_{current}$=Vehicle deceleration;
$t_{UD}$=time to reach minimum underdrive
Gain=modifier as a function of brake pedal position and rate of change of the brake pedal position.

From step 312, the method proceeds to step 314. In step 314, the term $[d_{current} \times t_{UD} \times \text{Gain}]$ is capped at −40 to −50 miles per hour to protect from over-prediction. Proceeding to step 316, the predicted vehicle speed is used to determine the commanded speed ratio from a base ratio map using zero accelerator pedal and $v_{Pr}$. Proceeding to step 318, the commanded ratio may be used in conjunction with other subroutines for selecting speed ratios such as a subroutine for selecting speed ratios during a hill climb or hill decent.

The term Gain is a calibration table which is a function of brake pedal position and ratio of change of brake pedal position. The value of the calibration table ranges from 1 for high brake pedal position and high positive brake rate to zero for low brake pedal position or high brake pedal position with very negative brake rate (i.e., fast lift out pedal). This Gain table allows proper calculation of the predicted vehicle speed under any combination of brake pedal position and its rate of change.

It is appreciated that the transmission control module 200 containing the ratio selection method 300 of the present invention may be used with alternate powertrain designs incorporating a CVT, such as an electric powertrain having an electric motor, or a hybrid powertrain having both an internal combustion engine and an electric motor.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. A method for selecting a speed ratio for a continuously variable transmission (CVT) of a vehicle during braking, comprising:
   determining a distance of a brake pedal travel;
   determining a Current Actual Speed Ratio of the CVT when the distance of the brake pedal travel exceeds a predetermined distance;
   determining an amount of Available Speed Ratio Change ($\Delta r$);
   determining a Current Ratio Change Capability (Current-$\dot{r}$) of the CVT;
   determining a Predictive Ratio Change Capability (Predictive-$\dot{r}$) using the Current Ratio Change Capability (Current-$\dot{r}$);
   calculating a Time to Reach a Minimum Under-drive Speed Ratio ($t_{UD}$), wherein the ($t_{UD}$) includes the Available Speed Ratio Change ($\Delta r$) divided by the Predictive Ratio Change Capability (Predictive-$\dot{r}$);
   calculating a Predicted Velocity ($v_{Pr}$) of the Vehicle using ($t_{UD}$);
   determining a Desired Speed Ratio of the CVT using the Predicted Velocity of the Vehicle ($v_{Pr}$); and
   actuating the CVT to the Desired Speed Ratio.

2. The method of claim 1, wherein:

$$\Delta r = \text{(the Minimum Under-drive Speed Ratio)} - \text{(the Current Actual Speed Ratio)}.$$

3. The method of claim 2, where the minimum underdrive speed ratio is about 0.38.

4. The method of claim 2, wherein the Current Ratio Change Capability (Current-$\dot{r}$) is a measure of how quickly that the CVT can change speed ratios based on a plurality of operating conditions of the CVT, including engine revolutions per min (engine rpm), transmission fluid temperature, and transmission fluid pressure.

5. The method of claim 2, wherein the (Predictive-$\dot{r}$)= (Current-$\dot{r}$)/2.

6. The method of claim 2, wherein the (Predictive-$\dot{r}$)= [(Current-$\dot{r}$)+K]/2, where K is a Ratio Change Capability of the CVT at an idle engine rpm.

7. The method of claim 2, wherein the Time to Reach Minimum Underdrive ($t_{UD}$)={($\Delta r \times$K1)/[(Predictive-$\dot{r}$)×K2]}+K3, where:
   K1=Calibration Constant,
   K2=Confidence Factor, and
   K3=a Time Margin of about 400 milliseconds.

8. The method of claim 7, wherein K1 ranges from 0.0 to 1.0 and K2 ranges from 0.0 to 1.0.

9. The method of claim 2, wherein:

$$(v_{Pr}) = v_{current} [d_{current} \times t_{UD} \times \text{Gain}],$$

where:
   $v_{current}$=Current vehicle speed;
   $d_{current}$=Vehicle deceleration; and Gain=function of brake pedal position and rate of change of the brake pedal position.

10. The method of claim 9, wherein [$d_{current} \times t_{UD} \times$Gain] is capped at −40 to −50 miles per hour.

11. A ratio selection method for a continuously variable transmission (CVT) for a vehicle during deceleration, comprising:
determining at least one of a distance of a brake pedal travel and a rate of deceleration of the vehicle, wherein rate of deceleration of the vehicle is expressed as a negative value;
determining a Current Actual Speed Ratio of the CVT when at least one of the distance of the brake pedal travel exceeds a predetermined distance and rate of deceleration of the vehicle is below a predetermined valve;
determining an amount of Available Speed Ratio Change (Δr), wherein:

Δr=(the Minimum Under-drive Speed Ratio)−(the Current Actual Speed Ratio);

determining a Current Ratio Change Capability (Current-$\dot{r}$) of the CVT;
determining a Predictive Ratio Change Capability (Predictive-$\dot{r}$), wherein:

(Predictive-$\dot{r}$)=[(Current-$\dot{r}$)+K]/2, where K is a Ratio Change Capability at an idle engine rpm;
calculating a Time to Reach the Minimum Under-drive Ratio ($t_{UD}$), wherein ($t_{UD}$) includes the Available Speed Ratio Change (Δr) divided by the Predictive Ratio Change Capability (Predictive-$\dot{r}$);
calculating a Predicted Velocity of the Vehicle ($v_{Pr}$) using ($t_{UD}$);
determining a Desired Speed Ratio of the CVT using the Predicted Velocity of the Vehicle ($v_{Pr}$); and
actuating the CVT to the Desired Speed Ratio.

12. The method of claim 11, wherein:
Time to Reach Minimum Underdrive ($t_{UD}$)={(Δr×K1)/[(Predictive-$\dot{r}$)×K2]}+K3,
where:
K1=Calibration Constant,
K2=Confidence Factor, and
K3=a Time Margin of about 400 milliseconds.

13. The method of claim 12, wherein:

Predicted Velocity of the Vehicle($v_{Pr}$)=$v_{current}$+ [$d_{current} \times t_{UD} \times$Gain], where:
$v_{current}$=Current vehicle speed;
$d_{current}$=Vehicle deceleration; and
Gain=function of brake pedal position and rate of change of the brake pedal position.

14. The method of claim 13, wherein [$d_{current} \times t_{UD} \times$Gain] is capped at −40 to −50 miles per hour.

15. The method of claim 14, wherein K1 ranges from 0.0 to 1.0 and K2 ranges from 0.0 to 1.0.

16. A system for implementing a method for selecting a speed ratio for a continuously variable transmission (CVT) of a vehicle during braking, comprising:
a vehicle speed sensor configured to detect the velocity of the vehicle;
a CVT speed ratio sensor;
a brake pedal position sensor;
at least one powertrain operating factor sensor; and
a transmission control module (TCM) in communication with the vehicle speed sensor, CVT speed ratio sensor, and the at least one powertrain operating factor sensor, where in the TCM is configured to:
determine a distance of a brake pedal travel;
determine a Current Actual Speed Ratio of the CVT when the distance of the brake pedal travel exceeds a predetermined distance;
determine an amount of Available Speed Ratio Change (Δr), wherein Δr=(minimum under-drive speed ratio)−(Current Actual Speed Ratio); and
determine a Desired Speed Ratio of the CVT.

17. The system of claim 16, wherein the TCM is further configured to:
determine a Current Ratio Change Capability (Current-$\dot{r}$) of the CVT; and
determine a Predictive Ratio Change Capability (Predictive-$\dot{r}$) using the Current Ratio Change Capability (Current-$\dot{r}$).

18. The system of claim 17, wherein the TCM is further configured to:
calculate a Time to Reach the Minimum Under-drive Ratio ($t_{UD}$), wherein ($t_{UD}$) includes the Available Speed Ratio Change (Δr) divided by the Predictive Ratio Change Capability (Predictive-$\dot{r}$); and
calculate a Predicted Velocity of the Vehicle ($v_{Pr}$) using ($t_{UD}$).

19. The system of claim 18, wherein the TCM is further configured to:
determine a Desired Speed Ratio of the CVT using the Predicted Velocity of the Vehicle ($v_{Pr}$); and
actuate the CVT to the Desired Speed Ratio.

20. The system of claim 19, wherein:
(Predictive-$\dot{r}$)=[(Current-$\dot{r}$)+K]/2, where K is a Ratio Change Capability at an idle engine rpm;
Time to Reach Minimum Underdrive ($t_{UD}$)={(Δr×K1)/[(Predictive-$\dot{r}$)×K2]}+K3, where: K1=Calibration Constant, K2=Confidence Factor, and K3=a Time Margin of about 400 milliseconds; and the Predicted Velocity of the Vehicle($v_{Pr}$)=$v_{current}$+ [$d_{current} \times t_{UD} \times$Gain], where:
$d_{current}$=Vehicle deceleration;
$v_{current}$=Current vehicle speed; and
Gain=function of brake pedal position and rate of change of the brake pedal position.

* * * * *